March 28, 1961 H. REDLICH 2,977,424

ARRANGEMENT FOR PRODUCING A SOUND RECORDING

Filed Dec. 13, 1957 2 Sheets-Sheet 1

Inventor:
Horst Redlich
By [signature]
Patent Agent

March 28, 1961 H. REDLICH 2,977,424

ARRANGEMENT FOR PRODUCING A SOUND RECORDING

Filed Dec. 13, 1957 2 Sheets-Sheet 2

Inventor:
Horst Redlich
By [signature]
Patent Agent

United States Patent Office 2,977,424

Patented Mar. 28, 1961

2,977,424

ARRANGEMENT FOR PRODUCING A SOUND RECORDING

Horst Redlich, Berlin-Lichterfelde-West, Germany, assignor to Teldec-Telefunken-Decca Schallplatten G.m. b.H., Hamburg, Germany Filed Dec. 13, 1957, Ser. No. 702,715

6 Claims. (Cl. 179—100.4)

Figure 1:
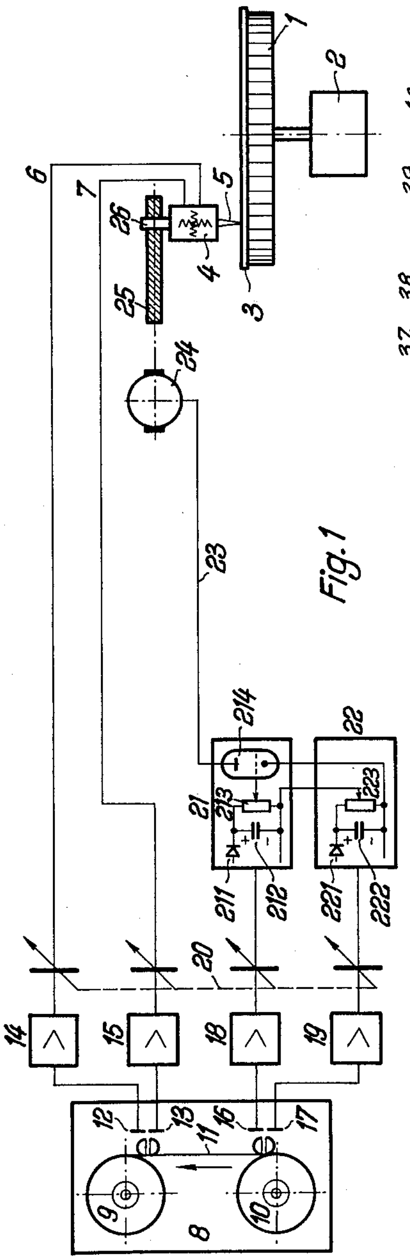

The invention relates to a method and arrangement for producing a sound recording by means of a grooved sound track. Such sound recordings are made for example on disk records or tape-shaped sound carriers by means of adajacent sound tracks. The invention relates also to a sound carrier manufactured in accordance with said method and said arrangement.

It is well-known to record two different signals having perpendicular directions of vibration simultaneously in a single sound track. For example, one signal may be recorded as a lateral recording and the other signal as a hill-and-dale recording. In technical literature, lateral recording is often referred to as Berlin recording, hill-and-dale recording, as Edison recording. Since both directions of vibration lying in a normal plane of the groove tangent are at right angles, each signal can be reproduced separately by means of a pickup device operated in response to one of said directions of vibration. It has already been proposed to provide mechanical-electrical transducers to write or read grooved sound tracks containing two signals, wherein a common recording or reproducing stylus is used for both signals and sufficient decoupling between both signal channels is achieved through a special construction of the writing or reading system. In the German Patent 816,311 there is disclosed a sound pickup device for a groove containing two signals as above described, wherein the reproducing systems are decoupled magnetically, electrically or mechanically.

The invention deals with the problem of causing the space interval between adjacent grooves, which interval is normally constant during feed movement transverse to the groove direction, to vary in accordance with the signal amplitude so that the envelopes of two adjacent sound tracks are closely adjacent to each other. In the case of lateral recording only is a solution to this problem already known (German patent application R 1843 IXa/42g, laid open to public inspection on June 10, 1954). Application of this principle to lateral recording results advantageously in a better utilisation of space in the writable part of a sound carrier, so that either the playing time or the sound-volume ratio, or both, can be increased for a similar recording surface.

In the case of a sound track containing a lateral recording and a hill-and-dale recording in the same groove it would seem obvious to control the groove interval by means of the amplitude of the signal recorded as lateral recording only, since it would appear in first place that said signal only could have its share in the lateral deflections of the sound track. This would in fact be true if a groove profile having sides at right angles with the sound carrier surface, or at least very steep sides, could be used. In practice, however, because of the reading process and especially the provision for a safe and clamp-free drive of the pickup stylus, a groove profile with sloped sides must be employed, which profile may be referred to as a triangular profile, ignoring the rounded part at the groove bottom. Now, it has been found that with a triangular groove profile the share of the hill-and-dale recording in the reduction of the lateral space in a sound track containing also a lateral recording is considerable and, when taken into account in the automatic control of the groove interval, gives rise to a surprising saving of space, all other things being equal. This is also true when the recording directions are not normal and parallel, respectively, to the sound carrier surface, as assumed in the aforementioned example, but at any angle thereto, while remaining at right angles to each other. In particular the possibility of arrangement both perpendicular directions of vibration so that they are both at 45° with respect to the sound carrier surface should be mentioned.

As a result of the knowledge gained by the abovementioned investigation, the distance between the midlines of two adjacent grooved sound tracks each containing two signals is controlled according to the invention in response to a control value which consists of two components corresponding to the amplitudes of both signals to be recorded on the same spot. Since it is difficult to combine the instantaneous values of the two signal vibrations by superposing the corresponding voltages, because of the necessity of allowing for phase relationships, the components of the control value are derived by separate rectification of a portion from each signal current. D.C. currents or D.C. voltages so obtained can be combined in known manner, for example in an arrangement wherein output resistors of both rectifiers form a series circuit.

Generally the two types of recording made in a groove do not contribute equally to the lateral component of the composite recording. According to a further aspect of the invention, it is therefore advantageous, when combining the components of the control value, to make each component a ratio of the resulting control value, in which ratio the corresponding signal vibration to be recorded forms part of the component of the resulting recording amplitude parallel to the sound carrier surface. As it appears from the above considerations on the groove profile and the angular position of the directions of vibration with respect to the sound carrier, this ratio depends both on the side angle of the profile, or the writing stylus, and on the orientation of the directions of vibration. In a particular example of pure lateral and hill-and-dale recordings, the directly generated lateral component of one signal track, say, the hill-and-dale track, is zero. But when the stylus enters deeper into the sound carrier surface the tracks become wider and there appears the effect already mentioned to the pure hill-and-dale amplitude requiring also an additional lateral space. In the other particular example, where the directions of vibration are at 45° with respect to the sound carrier surface, said additional space demand, now relating to both recordings, is combined with the lateral vibration components also existing in both recordings. In this case the efficiency ratio to be used in setting up the control value is 1:1. When the angular positions of the directions of vibration are selected between said particular examples, slightly differing efficiency ratios are obtained, whose magnitude can be readily determined by calculation or experimentaly on the basis of the given geometrical relationships.

Adjustment of an efficiency ratio determined in such a way can readily be achieved by means of one or more adjustable resistors or voltage dividers in, or in connection with, the circuit elements deriving the components of the control value.

The invention applies more particularly to binaural sound recordings. As known, the origin of spatial audition is to be found in the small amplitude and phase differences between the sounds perceived by the listener's ears. Therefore in the case of a binaural sound recording both signals cannot differ from each other by any arbitrary amount. In particular amplitude variations in both signals are widely similar; in fact, in the process of controlling groove interval, phase differences are concerned in that an amplitude jump occurs in both signals but with a certain time lag, whereby according to the position of the sound source with respect to the connection line between the pickup devices either one device or the other will first record said amplitude jump. Since however there is a large similarity in the amplitude variation of both signals, some simplification may be achieved in producing the control value, once it is ensured that the influence of the earlier and greater need for space is taken into account in one of the signals. This requirement can be met in a simple manner by using the rectified current components derived from the signals to charge a common buffer condenser to the voltage corresponding to the occasional greater signal amplitude and by deriving the control value from the voltage of said buffer condenser. In this case it is not necessary to provide two components of the control value in a predetermined ratio so that operation and construction of the arrangement are simplified.

Fig. 1 of the accompanying drawings shows an arrangement for generating a sound recording according to the invention. The parts already known which do not enter the scope of the invention are shown diagrammatically or in block form.

Figure 1A:
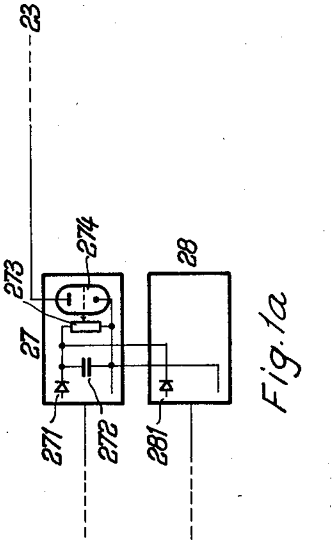

Fig. 1*a* is a schematic diagram of a modification of a portion of Fig. 1.

Figure 4:
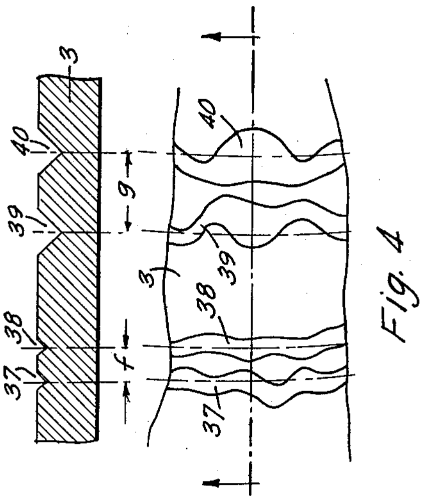
Figure 2:
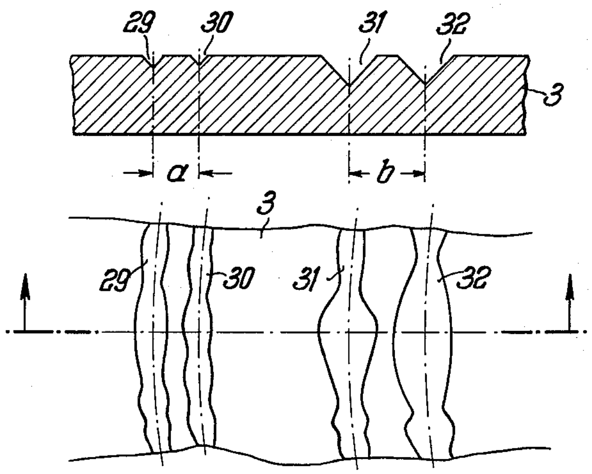
Figure 3:
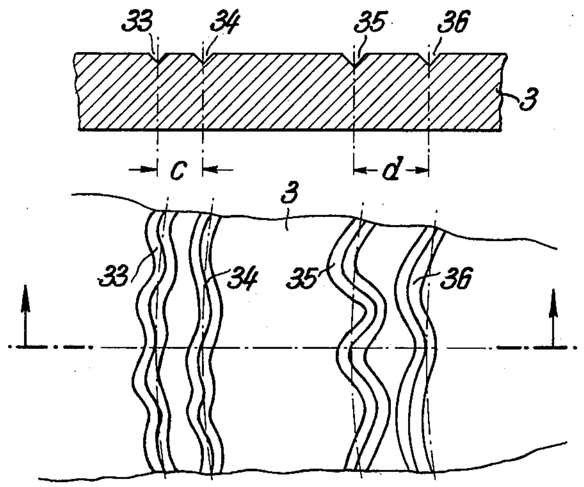

Figs. 2, 3 and 4 represent cross-sections and top views of a portion of a sound carrier provided with a sound recording according to the invention. It is assumed in these drawings that one signal is written in the form of a lateral recording and the other signal is written in the same groove in the form of a hill-and-dale recording. This means that one vibration component of the recording stylus corresponding to one signal to be recorded is at right angles with the sound carrier surface whereas the other vibration component corresponding to the other signal to be recorded in the same groove is parallel to the sound carrier surface. Fig. 2 shows (greatly enlarged) the resulting shape of the grooves when only the channel relating to the signal written in hill-and-dale recording contains a signal vibration while simultaneously in the channel relating to the signal written in lateral recording the amplitude of the signal vibration is zero. Fig. 3 represents the reversed conditions, wherein the amplitude of the signal is zero in the channel whose signal vibrations are written in hill-and-dale recording. Simultaneously however a finite signal vibration amplitude exists in the channel whose signal vibrations are applied in lateral recording. Fig. 4 illustrates the general case where there are vibrations of finite amplitude in both signal channels so that the hill-and-dale recording is superposed to a related lateral recording.

In Fig. 1 of the drawings there is shown an arrangement embodying a method according to the invention in the form of a considerably simplified circuit diagram wherein all the unnecessary parts for explaining the invention have been omitted. The reference character 1 denotes the turntable of a recording apparatus for disk records which is rotated at the desired speed by means of a drive 2. On the turntable 1 is placed a matrix 3 of suitable material. The writing head 4 is supported above the surface of the matrix 3 by a guiding device which may be of any conventional structure and which allows for a slight displacement of the writing head in the direction of a disk radius. The writing head supports, at the lower end thereof, the writing stylus 5 which may be provided with a wedge-shaped diamond cutting edge. The driving system of the writing head is connected to the corresponding amplifiers 14 and 15 via the conductors 6 and 7; both signal vibrations to be recorded can be derived from the outputs of said amplifiers in the form of alternating currents of corresponding intensity. The writing stylus 5 is moved in the direction of the disk radius by signals transmitted via the conductor 6 in response to the signal to be written in lateral recording and it is moved upwards and downwards by signals transmitted via the conductor 7 in response to the signal to be written in hill-and-dale recording. For recording a sound signal in the form of a groove-shaped sound track an intermediate tone member is usually employed, said member comprising generally a magnetic tape connected to a corresponding apparatus for setting up a first intermediate recording of the sound event to be recorded. On the drawing there is shown such a magnetic tape apparatus denoted by 8; the magnetic tape 11 thereof is being wound up from the spool 10 onto the spool 9, running therebetween past two separate reading heads relatively widely spaced from each other and having coils 12, 13, 16 and 17. The signal to be recorded laterally is derived from the coil 12 in known manner. The signal voltage is amplified in the amplifier 14 to the corresponding magnitude. The signal to be recorded in hill-and-dale is derived from the coil 13 and also applied to the driving system via the amplifier 15 and the conductor 7.

The writing head may be of any conventional construction. The cross coil windings illustrated in the block 4 representing the writing head indicate that said writing head comprises two electro-mechanical transducing systems, which give rise to lateral displacements of the writing stylus 5 in response of the currents delivered by the conductor 6 and to upwards and downwards displacements of said stylus in response of the currents delivered by the conductor 7.

In the same way as previously described for the coils 12 and 13 a lateral recording signal is derived from the magnetic tape 11 via the coil 16 and amplified in the amplifier 18 while a hill-and-dale recording signal is derived from the magnetic tape 11 via the coil 17 and amplified in the amplifier 19. A control device, adjustable by means of the common driving element 20 and having the same action on every channel, is arranged in the output circuits of the amplifiers 14, 15, 18 and 19. By means of this device the pickup level of the two signals to be recorded can be varied simultaneously with the level of the control value derived through two auxiliary devices to be described hereafter. Said auxiliary devices for generating the control value which serves to control the feeding are denoted by 21 and 22. As shown diagrammatically on Fig. 1 the device 21 comprises a rectifier 211, a condenser 212 charged through said rectifier and a resistor 213 arranged in parallel with said condenser. An adjustable tap on the resistor 213 is connected to the control grid of a valve 214 whose anode is connected to the driving motor 24 via the conductor 23 for feeding purpose. The feeding motor 24 drives the writing head 4 in the direction of the disk radius via the lead screw 25 and the nut 26 cooperating with said screw. The device 22 comprises a rectifier, denoted by 221, and a condenser 222, the latter being charged by a rectified voltage derived via the rectifier 221 from the signal voltage generated in the amplifier 19. Arranged in parallel with the condenser 222 is a resistor 223 whose adjustable tap is connected to the lower end of the resistor 213 within the device 21. As a result of the series-connection of the portions of both resistors the valve 214 is controlled at the grid thereof by a sum value which is formed by the rectified voltages from rectifiers 211 and 221.

Since, as above mentioned, a lateral recording signal is derived from the magnetic tape 11 via the coil 16 while a hill-and-dale recording signal is derived from the same magnetic tape via the coil 17, the rectified voltages at condensers 212 and 222 correspond to the amplitudes within the lateral and hill-and-dale recording channels. By means of a slider on each of the resistors 213 and 223, suitable components of the voltages at both aforementioned condensers are derived and the sum of said components is then used to control the valve 214. As a result, the anode current of said valve, which serves via the conductor 23 to determine the speed of rotation of the driving motor 24 for feeding purpose, is varied correspondingly. The arrangement can thus be used to accelerate feeding when greater amplitude values occur in one of the channels, either in the lateral recording channel or in the hill-and-dale recording channel, or also in both channels. Since, as a result of the coils 16, 17 being placed before the coils 12, 13 the signals derived for generating the control value have a certain time lead, control of feeding can be performed early so that space required for recording greater amplitudes is already available on the matrix when the signals transmitted by conductors 6 and 7 reach said matrix.

Consequently in the form according to Fig. 1 feeding of the writing stylus relative to the sound carrier is so controlled in a direction perpendicular to the mid-line of the groove and parallel to the sound carrier surface that the interval between the mid-lines of two adjacent grooves corresponds at any point of said grooves on the sound carrier to a sum value of two components, one of which is proportional to the amplitude of one signal and the other is proportional to the amplitude of the other signal, said signals being recorded in the second-formed groove.

When recording two sound signals related to each other in the manner of two binaural signals, it may often be sufficient to control feeding of the writing stylus relative to the sound carrier in a direction perpendicular to the mid-line of the groove and parallel to the sound carrier surface so that the interval between mid-lines of two adjacent grooves at any point of said grooves on the sound carrier corresponds to the amplitude of the stronger of both signal vibrations which are recorded in the second-formed groove. This result can be obtained by a simplification of the arrangement according to Fig. 1 which is illustrated in Fig. 1*a*. In Fig. 1*a* the devices 21 and 22 of Fig. 1 are replaced by the devices 27 and 28 respectively. It will be assumed that the inputs of 27 and 28 on the left-hand side thereof are connected to the outputs of the corresponding amplifiers 18 and 19, while the output conductor 23 of the device 27 is connected to the input of the driving motor 24 for feeding purpose, as already shown in Fig. 1. The device 27 comprises the rectifier 271 and a charging condenser 272 connected to the output of said rectifier, and also to the output of rectifier 281 mounted within the device 28. A variable resistor 273, the slider of which is connected to the grid of valve 274, is arranged in parallel with said charging condenser. The valve 274 performs the same functions as the valve 214 of Fig. 1. The condenser 272 is now charged at any time with an amount of voltage which corresponds to the greater of the two channel amplitudes. It will also be appreciated that with binaural signals of similar amplitude variations in both channels assumed in that case, the condenser 272 is responsive to the first amplitude jump occurring in one of the channels.

In Figs. 2–4, the reference numeral 3 denotes the matrix used in the arrangement of Fig. 1 and carrying the sound recording in groove form. In Figs. 2–4 only a small portion of said matrix is illustrated greatly enlarged. By means of galvanoplastic methods and pressing processes well-known in the copying technique any number of copies of the original matrix can be made, which copies correspond accurately in their structure to the original matrix. Said copies are manufactured however in a sufficiently wear-resistant material, so as to allow for frequent reproduction of the recorded signals. Because of the aforementioned identity in structure between copies and original matrix, Figs. 2–4 represent at the same time a sound carrier manufactured according to the method of the invention.

Fig. 2 shows the characteristics of a sound carrier or matrix manufactured according to the invention when the signal amplitude transmitted by the conductor 7 of Fig. 1 and written in hill-and-dale recording has a finite magnitude, whereas the signal amplitude transmitted by the conductor 6 and written in lateral recording is zero. The upper part of the drawing represents a cross-section through a portion of the sound carrier 3 along the line joining the arrows in the lower part of the drawing. In the left-hand side of the drawing there are shown two grooves 29 and 30 in which a relatively small vibration amplitude has been recorded. Accordingly the interval between the mid-lines of said grooves, which is denoted by *a* is relatively small owing to a corresponding control of the feeding motor 24 of Fig. 1. In the right-hand side of the drawing there are represented two grooves 31 and 32 in which a substantially greater amplitude is written in the form of a hill-and-dale recording. In order to take into account the space required in this case, feeding is accelerated correspondingly by means of the motor 24 of the arrangement in Fig. 1, so that the interval between the mid-lines of grooves 31 and 32, which is denoted by *b*, is increased correspondingly. The lower part of Fig. 2 is a top view of the sound carrier surface showing how in this manner there is always provided for a sufficient bridge of material to remain between two groove profiles.

Fig. 3 shows the configuration of a matrix or a finished sound carrier according to the invention in the case where the amplitude of the signal transmitted by the conductor 7 of Fig. 1 and written in the form of a recording is zero, while the amplitude of the signal transmitted by the conductor 6 and written in the form of a lateral recording has a finite magnitude. As in Fig. 2, two grooves 33 and 34 are illustrated in the left-hand side of the drawing, in which grooves a signal of relatively small amplitude is recorded. Accordingly the interval denoted by *c* between the mid-lines of said grooves, which represent the mean paths of the recording stylus 5 rather than the actual center lines of the grooves 35 and 36 is relatively small too. In the right-hand side of the drawing there are shown two grooves 35 and 36 in which a signal of greater amplitude is recorded. Accordingly the interval between the mid-lines of said grooves is increased.

Fig. 4 shows the configuration of a matrix or a finished sound carrier manufactured by means of the arrangement of Fig. 1 in the most general case, that is, when finite signal amplitudes are present both in the lateral recording channel and the hill-and-dale recording channel. It has been explained previously that through the series-connection of the output resistors of rectifiers 211 and 221, the valve 214 and, consequently, the feeding motor 24, is controlled by the combined effect of the rectified voltages. Accordingly the interval between the mid-lines of the grooves in Fig. 4 will be so increased that space requirements of both signals written in the same groove are taken into account. Again, in the left-hand side of the drawing there are shown two grooves 37 and 38 having relatively small signal amplitudes and in the right-hand side of the drawing two grooves 39 and 40 having relatively large signal amplitudes; intervals between the mid-lines of the two pairs of grooves are denoted by *f* and *g* respectively.

Considering the fact that when the amplitude is zero in each signal channel of the arrangement according to Fig. 1, the writing stylus 5 is moved in the radial direction of the matrix with the smallest rate of feed, whereby the groove slope is represented by the value *k*, the intervals between the mid-lines of the grooves such as represented in Figs. 2 and 3 can be expressed in the following form:

$$a=k+\Delta a$$
$$b=k+\Delta b$$
$$c=k+\Delta c$$
$$d=k+\Delta d$$

In the above relationships $\Delta a$, $\Delta b$, $\Delta c$ and $\Delta d$ are the respective increases of the groove interval which are obtained in response to the control action by the resulting acceleration of the rotation of the feeding motor 24.

For the intervals between the mid-lines of grooves 37, 38 and 39, 40 of Fig. 4, which are denoted by $f$ and $g$, the following relationships are obtained owing to the efficiency of the arrangement according to Fig. 1:

$$f=k+\Delta a+\Delta c$$
$$g=k+\Delta b+\Delta d$$

It is therefore a characteristic feature of a sound carrier manufactured according to the invention that when finite amplitudes are set up simultaneously in the lateral recording channel and in the hill-and-dale recording channel, the groove interval is increased by an amount depending on the amplitude of the lateral recording signal and also by an amount depending on the amplitude of the hill-and-dale recording signal, as compared with the smallest interval $k$.

If, instead of the arrangement illustrated in Fig. 1, the simplified arrangement of Fig. 1*a* is employed, intervals between the mid-lines of the grooves according to Fig. 4 are expressed as follows:

$$f=k+n.\Delta ac$$
$$g=k+n.\Delta bd$$

The above relationships indicate that when using the arrangement according to Fig. 1*a*, the respective increase of the groove slope with respect to the smallest value $k$ can be represented by the product of the constant factor $n$ selected of suitable magnitude by an increment which depends on the greater amplitude from the two amplitudes within the lateral recording channel and the hill-and-dale recording channel, respectively. This increment is denoted by $\Delta ac$ and $\Delta bd$, respectively, in order to indicate that the circuit according to Fig. 1*a* estimates automatically which is the greater of two amplitude variations for the purpose of generating the control voltage.

Accordingly, Fig. 4 also represents the configuration of a finished sound carrier in the case where the simplified arrangement shown in Fig, 1*a* is used for manufacturing said carrier. Only the increments for the groove slope are combined somewhat differently in the last mentioned case than they were when using the arrangement of Fig. 1. If however the signals dealt with are binaural signals, the arrangement represented in Fig. 1*a* is often sufficient. It is therefore a characteristic feature of a sound carrier manufactured according to the invention that, when using the arrangement of Fig. 1, the interval between the mid-lines of two adjacent grooves corresponds at any point of said grooves on the sound carrier to a sum value of two components, one of which is proportional to the amplitude of one signal and the other is proportional to the amplitude of the other signal, said signals being recorded in the second-formed groove. When using the arrangement according to Fig. 1*a* it is a characteristic feature of a sound carrier manufactured according to the invention that the interval between mid-lines of two adjacent grooves corresponds to the amplitude of the stronger of two signal vibrations recorded in the second-formed groove.

I claim:

1. In an apparatus for recording in a grooved sound track two different sound signals by a single stylus, each signal causing movements of said stylus in directions which are mutually perpendicular and which lie in a plane normal to the tangent of the groove, the combination which comprises: means for moving said stylus and a record receiver with respect to each other in a direction transversely to said groove for producing a plurality of sound grooves substantially parallel to each other on the same record receiver; means deriving control signals from each of said sound signals to be recorded; means for rectifying each control signal independently of the other control signal and for combining the rectified control signals into a composite control force in which each single control signal is in the same proportion to the composite force as the sound signal from which it is derived is in proportion to the total sound signal to be recorded; and means responsive to said composite control force for controlling the relative movement between said stylus and said record receiver in the direction transverse to said sound groove and determining the amount of space to be left between adjacent grooves in proportion to the relative amplitudes of the two control signals.

2. The combination defined in claim 1 wherein said means responsive to the composite control force control the relative movement between said stylus and said record receiver in such a manner that one of said signals is recorded in lateral type and the other signal in hill-and-dale type with a substantially triangular groove profile.

3. The combination defined in claim 1 wherein said stylus is controlled to record two signals in directions of vibration at 45° with the surface of said record receiver.

4. The combination defined in claim 1, further comprising means utilizing rectified current components for charging a common condenser to the voltage corresponding at any time to the greater signal amplitude, and means for taking a control value from the voltage of said condenser.

5. The combination defined in claim 1 wherein said means for combining said rectified control signals combine the same in such a manner that the amount of space between the mid-lines of two adjacent grooves at any point of the grooves on the sound carrier corresponds to the amplitude of the stronger one of the two sound signals which are recorded in the second-formed groove.

6. The combination defined in claim 1 wherein said means for combining said rectified control signals combine the same in such a manner that the amount of space between the mid-lines of two adjacent grooves at any point of said grooves on the sound carrier corresponds to the sum of two components, one of which components is proportional to the amplitude of one sound signal and the other of which is proportional to the amplitude of the other sound signal, both of said signals being recorded in the second-formed groove.

References Cited in the file of this patent

UNITED STATES PATENTS

| | | |
|---|---|---|
| 2,014,528 | Keller | Sept. 17, 1935 |
| 2,025,388 | Henning | Dec. 24, 1935 |
| 2,112,699 | Kleber | Mar. 29, 1938 |
| 2,258,662 | Snow | Oct. 14, 1941 |
| 2,611,038 | Graham | Sept. 16, 1952 |
| 2,738,385 | Bachman | Mar. 13, 1956 |
| 2,847,514 | Evans | Aug. 12, 1958 |